(12) United States Patent
Harayama

(10) Patent No.: US 10,069,128 B2
(45) Date of Patent: Sep. 4, 2018

(54) BATTERY PACK

(71) Applicant: TOYOTA JIDOSHA KABUSHIKI KAISHA, Toyota-shi, Aichi (JP)

(72) Inventor: Takashi Harayama, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 537 days.

(21) Appl. No.: 14/409,541

(22) PCT Filed: Apr. 24, 2013

(86) PCT No.: PCT/JP2013/061980
§ 371 (c)(1),
(2) Date: Dec. 19, 2014

(87) PCT Pub. No.: WO2013/190903
PCT Pub. Date: Dec. 27, 2013

(65) Prior Publication Data
US 2015/0180004 A1 Jun. 25, 2015

(30) Foreign Application Priority Data
Jun. 21, 2012 (JP) .................................. 2012-140024

(51) Int. Cl.
*H01M 2/26* (2006.01)
*H01M 2/06* (2006.01)
(Continued)

(52) U.S. Cl.
CPC ............. *H01M 2/202* (2013.01); *H01M 2/06* (2013.01); *H01M 2/08* (2013.01); *H01M 2/204* (2013.01);
(Continued)

(58) Field of Classification Search
CPC ........ H01M 2/06; H01M 2/08; H01M 2/202; H01M 2/204; H01M 2/206; H01M 2/26; H01M 2/30
See application file for complete search history.

(56) References Cited

U.S. PATENT DOCUMENTS

2003/0064285 A1* 4/2003 Kawamura ......... H01M 2/0469
429/181
2005/0158621 A1* 7/2005 Benoit ................ H01M 6/5066
429/178
(Continued)

FOREIGN PATENT DOCUMENTS

JP 2011-023142 A 2/2011

OTHER PUBLICATIONS

International Search Report for PCT/JP2013/061980 dated Aug. 6, 2013 [PCT/ISA/210].

*Primary Examiner* — Kenneth J Douyette
(74) *Attorney, Agent, or Firm* — Sughrue Mion, PLLC

(57) ABSTRACT

A battery pack has a plurality of series-connected batteries each having an electrode body, a battery case, a positive extending member, a positive external terminal mechanically joined and electrically connected to a positive external extending part of the positive extending member, by caulking deformation thereof, a negative extending member, and a negative external terminal mechanically joined and electrically connected to a negative external extending part of the negative extending member, by caulking deformation thereof. Among the positive and negative external extending parts, the positive and negative external terminals, the metal making up the positive external extending part has the lowest tensile strength. The battery pack includes bus bars; positive fastening members for fastening the positive external terminals to the bus bars; and negative fastening mem- (Continued)

bers for fastening the negative external terminals to the bus bars. The negative external terminal is thinner than the positive external terminal.

3 Claims, 5 Drawing Sheets

(51) Int. Cl.
*H01M 2/08* (2006.01)
*H01M 2/30* (2006.01)
*H01M 2/20* (2006.01)

(52) U.S. Cl.
CPC ............ *H01M 2/206* (2013.01); *H01M 2/26* (2013.01); *H01M 2/30* (2013.01); *H01M 2220/20* (2013.01); *H01M 2220/30* (2013.01)

(56) References Cited

U.S. PATENT DOCUMENTS

| | | | |
|---|---|---|---|
| 2006/0269840 A1* | 11/2006 | Oogami | H01M 2/06 429/181 |
| 2010/0047686 A1* | 2/2010 | Tsuchiya | H01M 2/202 429/178 |
| 2010/0140554 A1* | 6/2010 | Oki | H01M 4/131 252/500 |
| 2011/0052977 A1* | 3/2011 | Kurata | H01M 2/06 429/179 |

\* cited by examiner

BATTERY PACK

CROSS REFERENCE TO RELATED APPLICATIONS

This application is a National Stage of International Application No. PCT/JP2013/061980 filed Apr. 24, 2013, claiming priority based on Japan Patent Application No. 2012-140024 filed Jun. 21, 2012, the contents of all of which are incorporated herein by reference in their entirety.

TECHNICAL FIELD

The present invention relates to a battery pack including a plurality of batteries connected in series.

BACKGROUND ART

Recently, chargeable-dischargeable batteries are utilized as drive power sources of vehicles such as a hybrid car and an electric car or drive power sources of portable electronic devices such as a note-sized personal computer and a video camcorder. As one example of such batteries, Patent Document 1 discloses a battery including a power generating element, a battery case that houses the power generating element, and an electrode terminal member having an element connecting member penetrating through the battery case, an externally-located terminal member connected to the element connecting member, and a fastening member. This externally-located terminal member of the battery has a Z-like shape (a crank-like shape) including a fixed part, an intermediate part, and an outer connecting part. The element connecting member penetrates through the fixed part and a male screw part of the fastening member penetrates through the outer connecting part, respectively. On a positive electrode side, the element connecting member is made of pure aluminum, and a portion located outside the battery case, of this connecting member, is deformed by caulking or riveting to mechanically join the element connecting member to the externally-located terminal member and fix the externally-located terminal member to the battery case. On a negative electrode side, on the other hand, the element connecting member is made of pure copper, and a portion located outside the battery case, of this connecting member, is deformed by caulking or riveting to mechanically join the element connecting member to the externally-located terminal member and fix this externally-located terminal member to the battery case.

RELATED ART DOCUMENTS

Patent Documents

Patent Document 1: JP-A-2011-23142

SUMMARY OF INVENTION

Problems to be Solved by the Invention

Meanwhile, when a plurality of the batteries disclosed in Patent Document 1 are assembled into a battery pack, in many cases, a bus bar is interposed between the externally-located terminal member (a positive external terminal) on a positive electrode side (positive-side) of one of the batteries and the externally-located terminal member (a negative external terminal) on a negative electrode side (negative-side) of the other battery to connect them. To be concrete, with use of the aforementioned fastening members having the male screw parts and nuts, the positive-side externally-located terminal member (the positive external terminal) and the bus bar are fastened to each other or the bus bar and the negative-side externally-located terminal member (the negative external terminal) are fastened to each other.

Patent Document 1 does not particularly specify the materials of the positive-side externally-located terminal member (the positive external terminal) and the negative-side externally-located terminal member (the negative external terminal). However, if the positive external terminal is made of pure aluminum, it is likely to buckle due to fastening with the bus bar. Therefore, many of positive external terminals are made of aluminum alloy such as Al—Mg, higher in tensile strength than pure aluminum. On the other hand, many of negative external terminals are made of pure copper (tough pitch copper) the same as the negative-side element connecting member (the negative extending member). Accordingly, the tensile strength of the pure copper forming the negative extending member and the negative external terminal is higher than the tensile strength of the pure aluminum. Specifically, the metal forming the positive-side element connecting member (the positive extending member) has the lowest tensile strength.

When the batteries mentioned above are connected in series to assemble a battery pack, the positive external terminal of one of two batteries is fastened to the bus bar, and this bus bar is fastened to the negative external terminal of the other battery as mentioned above. However, the positions of the positive external terminal, negative external terminal, and bus bar may be displaced as compared with an ideal position due to dimensional tolerance and assembling error of the positive external terminal, negative external terminal, bus bar, or battery case. Therefore, when the positive external terminal, the negative external terminal, and the bus bar are fastened together, the positive external terminal, the negative external terminal, or the bus bar is apt to be deformed in association with the displacement. When stress is applied to the positive external extending parts deformed by caulking of the positive extending member made of pure aluminum lower in tensile strength through the positive external terminal, this caulked portion may undergo plastic deformation, thus loosening the caulking state.

The present invention has been made to solve the above problems and has a purpose to provide a battery pack including a battery configured to suppress loosening of a caulking state of a positive external extending part, deformed by caulking, of a positive extending member.

Means of Solving the Problems

To achieve the above purpose, one aspect of the invention provides a battery pack comprising a plurality of batteries connected in series, each of the batteries including: an electrode body; a battery case housing the electrode body; a positive extending member made of metal and connected to a positive electrode of the electrode body in the battery case and extended out of the battery case by penetrating through the battery case; a positive external terminal made of a metal plate, placed outside the battery case, and mechanically joined to a positive external extending part of the positive extending member, the positive external extending part being located outside the battery case and deformed by caulking to fix the positive external terminal to the battery case, the positive external terminal being electrically connected to the positive external extending part; a negative extending member made of metal and connected to a negative electrode of the electrode body in the battery case and extended out of the battery case by penetrating through the battery case; and a negative external terminal made of a metal plate, placed outside the battery case, and mechanically joined to a negative external extending part of the negative extending member, the negative external extending part being located outside the battery case and deformed by caulking to fix the negative external terminal to the battery case, the negative external terminal being electrically connected to the negative external extending part, among metals forming the positive external extending part of the positive extending member, the positive external terminal, the negative external extending part of the negative extending member, and the negative external terminal, the metal forming the positive external extending part of the positive extending member has lowest tensile strength, wherein the battery pack includes: bus burs each placed between the positive external terminal of one of the batteries and the negative external terminal of an other battery to connect the positive external terminal and the negative external terminal; a positive fastening member fastening the positive external terminal of the one battery to the bus bar; and a negative fastening member fastening the negative external terminal of the other battery to the bus bar, each of the batteries is configured such that the negative external terminal has a thinner plate thickness than a plate thickness of the positive external terminal.

In the aforementioned battery pack, the negative external terminal in each battery is made thinner in plate thickness than the positive external terminal, so that the negative external terminal is more likely to be deformed as compared to the case where the negative external terminal is designed to have the same plate thickness as the positive external terminal. Accordingly, when one battery is connected to the other battery in series, for example, as described above, even if the positive external terminal, the negative external terminal, or the bus bar is displaced in position from those in an ideal case, the stress caused by fastening them can be absorbed by deformation of the negative external terminal. Because of the negative external terminal absorbs the stress, the stress applied to the positive external extending part, deformed by caulking, of the positive extending member can be reduced, and thus the plastic deformation thereof can be suppressed. Consequently, the battery pack can be achieved including the batteries in which the positive external extending parts of the positive extending members are suppressed from loosening their caulking state.

The shapes of the positive external terminal and the negative external terminal, for example, may include a flat-plate shape, an L-like shape, a Z-like shape (a crank-like shape) bent in crank-like shape in a plate thickness direction, and others. The positive external terminal and the negative external terminal may be identical to or different from each other in shape. The metal tensile strength is represented by a value measured in "JIS Z2241". The materials of the positive extending member and the positive external terminal can be selected from pure aluminum, aluminum alloy, and others. Further, the materials of the negative extending member and the negative external terminal can be selected from pure copper, copper alloy, and others. However, the materials (metals) of the positive external extending part, the positive external terminal, the negative external extending part, and the negative external terminal are combined so that the metal forming the positive external extending part has the lowest tensile strength among the metals forming the positive external extending part, the positive external terminal, the negative external extending part, and the negative external terminal.

In the aforementioned battery pack, preferably, the metal forming the negative external terminal is a material having higher electrical conductivity than the metal forming the positive external terminal.

In the aforementioned battery pack, the metal forming the negative external terminal has a higher electrical conductivity than the metal forming the positive external terminal. Thus, the resistance increase can be suppressed to be lower when the negative external terminal is designed with a smaller plate thickness as compared with when the positive external terminal is designed with a smaller plate thickness. This makes it possible to achieve the battery pack using the batteries low in conductive resistance as a whole.

In the aforementioned battery pack, preferably, the metal forming the positive external extending part of the positive extending member is pure aluminum, the metal forming the positive external terminal is aluminum alloy, and both the metal forming the negative external extending part of the negative extending member and the metal forming the negative external terminal are pure copper.

In each battery mentioned above, the metal forming the positive external extending part of the positive extending member is made of pure aluminum, the metal forming the positive external terminal is aluminum alloy, and all the metals forming the negative external extending part of the negative extending member and the negative external terminal are pure copper. Therefore, the positive-side members (the positive extending member and the positive external terminal) and the negative-side members (the negative extending member and the negative external terminal) can provide good electric conductive performance. Furthermore, since the metal forming the positive external extending part of the positive extending member is pure aluminum, and the metal forming the negative external extending part of the negative extending member is pure copper, the battery can be provided with the positive external extending part and the negative external extending part, each of which has been appropriately deformed by caulking. In addition, the positive external terminal is made of aluminum alloy and the negative external terminal is made of pure copper, so that these positive and negative external terminals can be appropriately prevented from buckling when fastened to the bus bar.

The pure aluminum may be selected for example from alloy numbers 1050, 1070, 1080, and 1085 listed in "JIS H4000". The aluminum alloy may be selected for example from the alloy numbers of 2000 series (Al—Cu alloy) such as 2014 and 2017, the alloy numbers of 3000 series (Al—Mn alloy) such as 3003, 3103, the alloy numbers of 5000 series (Al—Mg alloy) such as 5005 and 5021, the alloy numbers of 6000 series (Al—Mg—Si alloy) such as 6101 and 6061, and the alloy numbers of 7000 series (Al—Zn—Mg alloy) such as 7010 and 7075, listed in "JIS H4000". Further, the pure copper may include oxygen-free copper having an alloy number C1020, tough pitch copper having an alloy number C1100, or phosphorous deoxidized copper having alloy numbers C1201, C1220, C1221, and others, listed in "IS0197" (adopted corresponding to "JIS H0500").

MODE FOR CARRYING OUT THE INVENTION (Embodiment)

Figure 1:
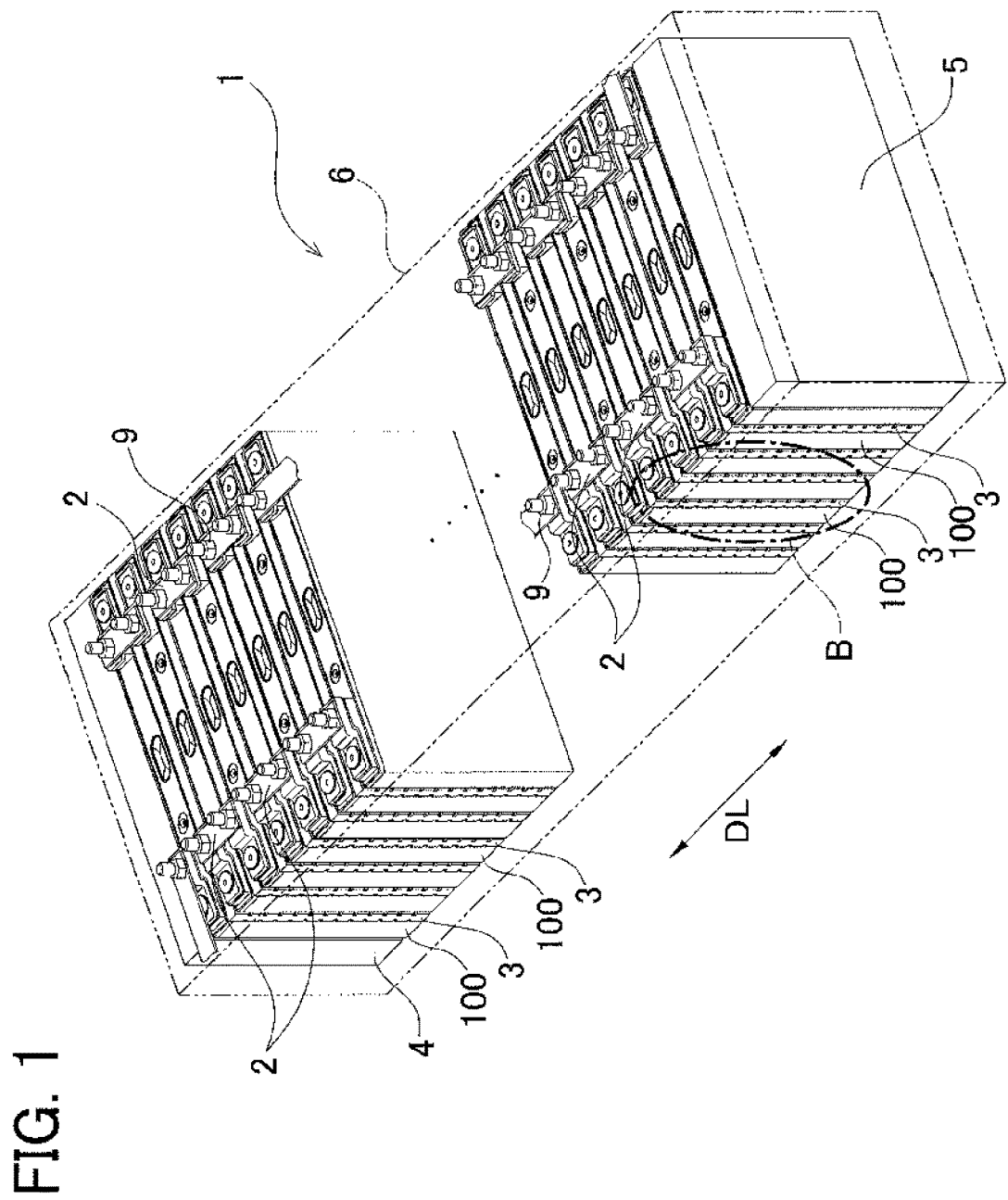
FIG. 1 is a perspective view of a battery pack in an embodiment.

A detailed description of a preferred embodiment of a battery pack 1 embodying the present invention will now be given referring to the accompanying drawings. FIG. 1 is a perspective view of this battery pack 1. The battery pack 1 includes fifty batteries 100, 100, bus bars 2, 2 each connecting the batteries 100 in series, plate-like members 3 alternately stacked with the batteries 100, and two end plates (a first end plate 4 and a second end plate 5) placed at both ends in a stacking direction DL by sandwiching therebetween the batteries 100 and the plate-like members 3. The battery pack 1 further includes nuts 9 cooperating with positive bolts 139 (mentioned later) or negative bolts 149 (mentioned later) of the batteries 100 to fasten the bus bars 2 to positive external terminals 137 (mentioned later) or negative external terminals 147 (mentioned later). This battery pack 1 houses a plurality of the batteries 100, 100 arranged in a single row in the stacking direction DL in a battery pack case 6. Of them, the first end plate 4 and the second end plate 5, each being made of metal and having a rectangular plate-like shape, are arranged at both ends in the stacking direction DL of the batteries 100, 100 to press against the batteries 100, 100 to suppress size change of the batteries 100 in the stacking direction DL. Each of the plate-like members 3 made of resin is provided, in each surface 3F contacting with the corresponding battery 100, with a plurality of rectangular strip-shaped recesses 3G extending perpendicular to the drawing sheet of FIG. 2 which is a partial enlarged end face view showing a section B in FIG. 1. These recesses 3G generate a plurality of rectangular gaps S to allow air to flow between the battery 100 and the plate-like member 3. By supplying cooling air to these gaps S, the battery 100 can be cooled.

Figure 2:
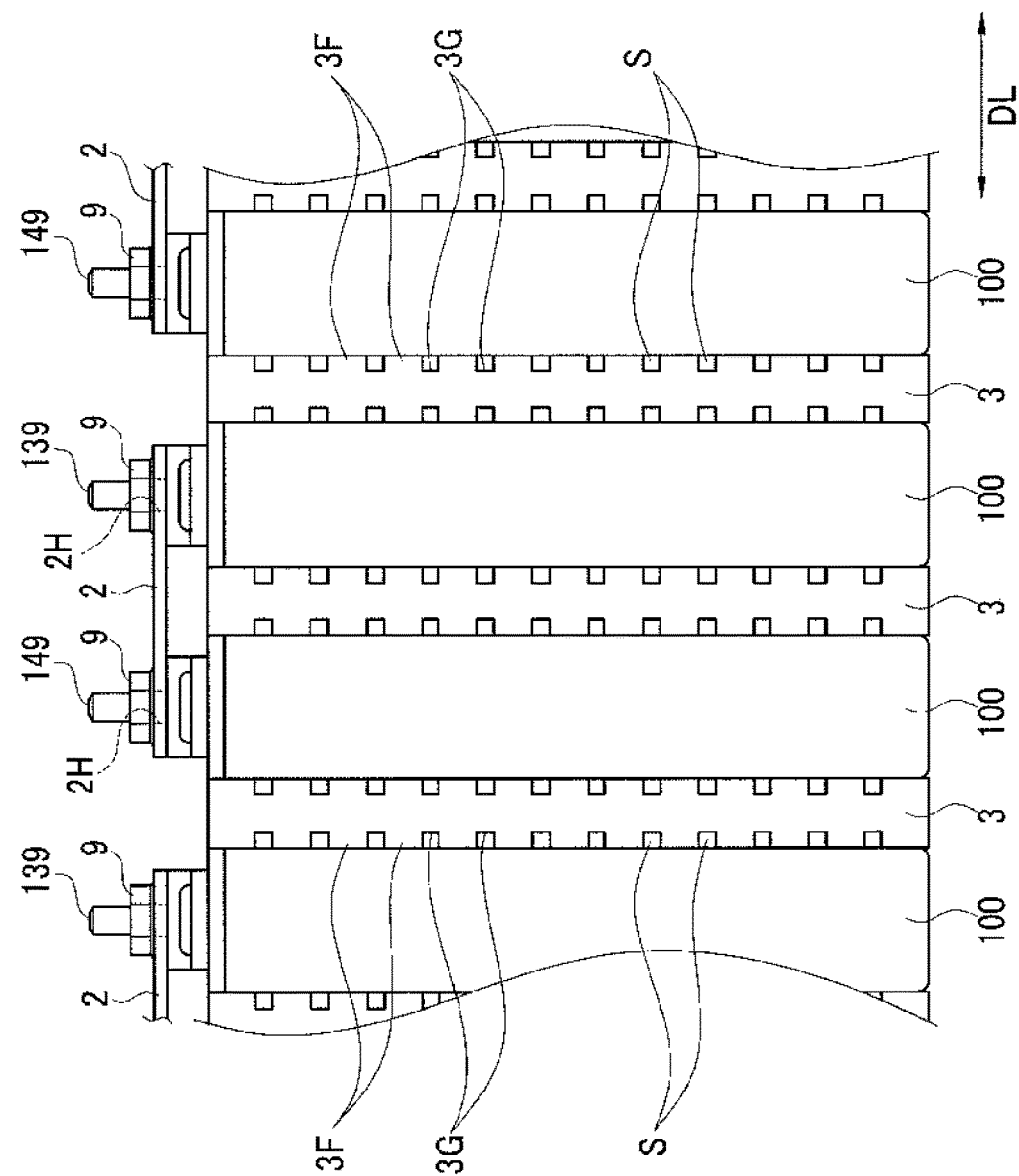
FIG. 2 is an explanatory view (a partial enlarged end face view) to explain connection between batteries of the battery pack in the embodiment.

Each of the flat-plate bus bars 2 made of pure copper (C1100) is formed with through holes 2H and 2H in both end areas (see FIG. 2). In these through holes 2H and 2H, the positive bolt 139 (mentioned below) and the negative bolt 149 (mentioned below) of the batteries 100 are inserted in connecting the batteries 100, 100 to each other. The battery pack 1 in the present embodiment is configured such that the plurality of batteries 100, 100 are connected in series, and the positive bolts 139 are inserted in ones of the through holes 2H of the bus bars 2, while the negative bolts 149 are inserted in the other through holes 2H (see FIG. 2).

Each of the batteries 100 is a lithium ion secondary battery including an electrode body 150 and a battery case 100 housing this electrode body 150. Each battery 100 is provided with a positive extending member 130 connected with a positive electrode sheet 151 of the electrode body 150 in the battery case 110 and extended out by penetrating through the battery case 110, and a positive external terminal 137 placed outside the battery case 110. Further, each battery 100 is provided with a negative extending member 140 connected with a negative electrode sheet 156 of the electrode body 150 in the battery case 110 and extended out by penetrating through the battery case 110, and a negative external terminal 147 placed outside the battery case 110. In addition to the above, there are provided the positive bolts 139 located outside the battery case 110 and electrically connected (connectable) to the positive external terminals 137 and the negative bolts 149 located outside the battery case 110 and electrically connected (connectable) to the negative external terminals 147. There are further provided first insulating members 170 each located between the positive extending member 130 or the negative extending member 140 and the battery case 110, and second insulating members 180 each placed on the battery case 110.

The battery case 110 includes a rectangular box-shaped case body 111 having an opening 111d, and a plate-shaped lid member 113 closing the opening 111d of the case body 111. The case body 111 and the lid member 113 are made integral by welding. The lid member 113 has a rectangular plate-like shape and is formed with circular through holes 113h and 113k each penetrating through the lid member 113 in its both end areas in a longitudinal direction (a right-left direction in FIG. 3). The case lid 113 is further provided, at its center in the longitudinal direction, with a safety valve 113j. This safety valve 113j is formed integral with the case lid 113 to constitute a part of the case lid 113. The case lid 113 is formed, between the safety valve 113j and the through hole 113k, with a liquid inlet 113n (see FIG. 3) through which electrolyte (not shown) is poured into the battery case 110. This liquid inlet 113n is sealed with a plug 113m.

This electrode body 150 is a wound electrode body of a flattened shape including the positive electrode sheet 151 having a strip shape, the negative electrode sheet 156 having a strip shape, and separators 159 interposed between the electrode sheets 151 and 156, which are wound together in a flat shape. The positive electrode sheet 151 includes a strip-shaped positive electrode foil 152 made of pure aluminum, and positive active material layers (not shown) each placed on part of each surface of the positive electrode foil 152. The negative electrode sheet 156 includes a strip-shaped negative electrode foil 157 made of pure copper, and negative active material layers (not shown) each placed on part of each surface of the negative electrode foil 157.

Each first insulating member 170 made of insulating resin serves to electrically insulate between the positive extending member 130 and the battery case 110 (the lid member 113) or between the negative extending member 140 and the battery case 110 (the lid member 113). This first insulating member 170 is placed between an upper surface 131f of a seat part 131 (mentioned later) of the positive extending member 130 or an upper surface 141f of a seat part 141 (mentioned later) of the negative extending member 140 and the battery case 110 (the lid member 113) so that the first insulating member 170 is elastically compressed in its thickness direction (a top-bottom direction in FIG. 3). Accordingly, the through holes 113h and 113k of the lid member 113 are sealed.

Each second insulating member 180 made of insulating resin serves to electrically insulate the positive external terminal 137 and the positive bolt 139 or the negative external terminal 147 and the negative bolt 149 from the battery case 110 (the lid member 113).

Figure 3:
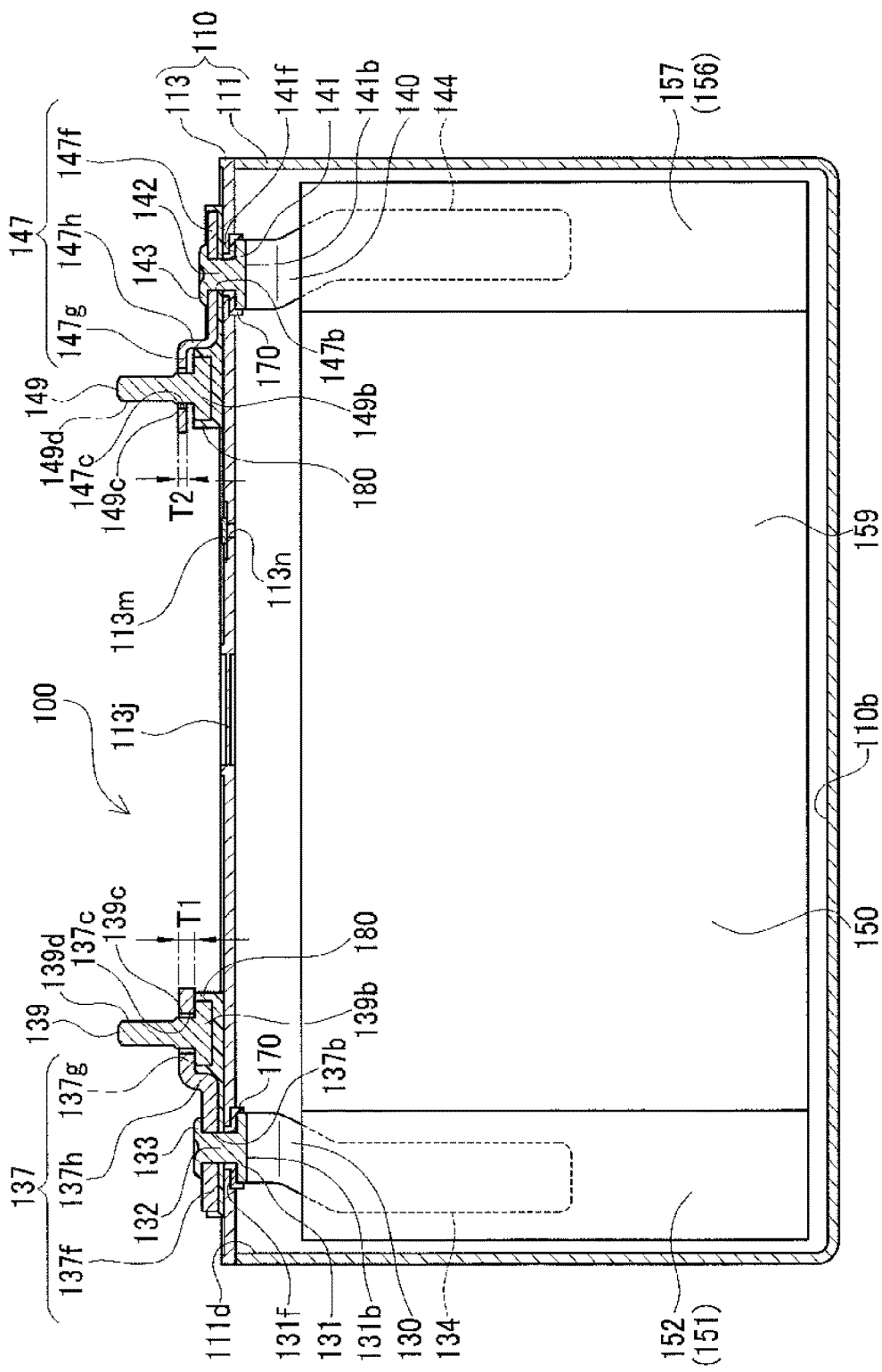
FIG. 3 is a vertical sectional view of the battery in the embodiment.

Each positive bolt 139 is a metal bolt including a rectangular plate-like head portion 139b and a circular columnar shaft portion 139c (see FIG. 3). The shaft portion 139c includes a distal end portion formed with screw threads 139d. While the shaft portion 139c of the fastening bolt 139 is inserted in a through hole 137c of the corresponding positive external terminal member 137, the head portion 139b is held against rotation in the corresponding second insulating member 180 (see FIG. 3). In the battery pack 1 in the present embodiment, this positive bolt 139 and the aforementioned nut 9 are used to fasten the positive external terminal 137 and the bus bar 2.

Each negative bolt 149 is also a metal bolt, as with the positive bolts 139, including a rectangular plate-like head portion 149b and a circular columnar shaft portion 149c (see FIG. 3). The shaft portion 149c includes a distal end portion formed with screw threads 149d. While the shaft portion 149c of the negative bolt 149 is inserted in a through hole 147c of the corresponding negative external terminal 147, the head portion 149b is held against rotation in the corresponding second insulating member 180 (see FIG. 3). In the battery pack 1 in the present embodiment, this negative bolt 149 and the aforementioned nut 9 are used to fasten the negative external terminal 147 and the bus bar 2.

Figure 4:
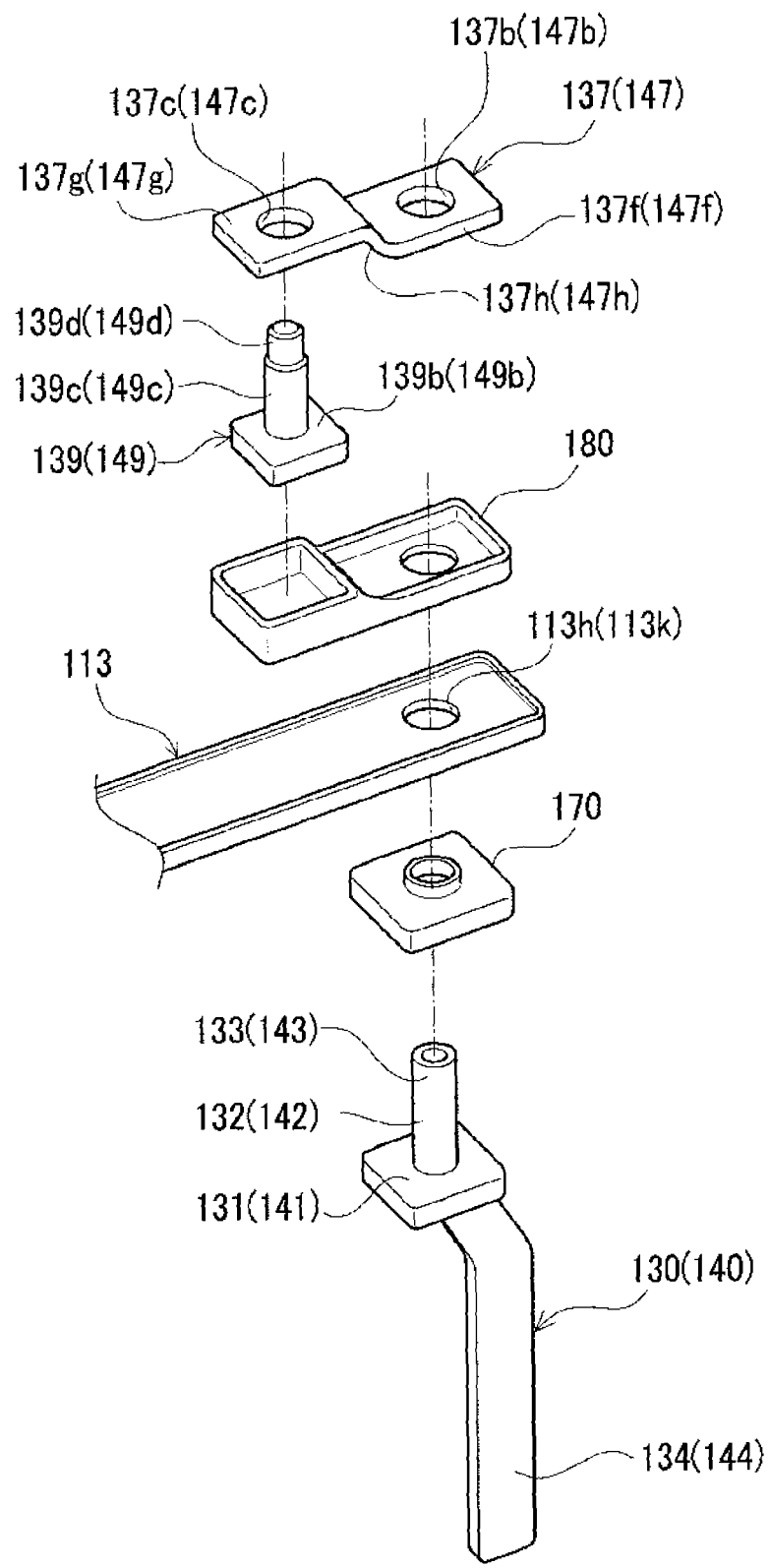
FIG. 4 is an exploded perspective view of a lid member of the battery in the embodiment.

The positive extending member 130 made of pure aluminum (A1050-H24 material) includes the seat part 131, a shaft part 132, a positive connecting part 134, and a positive deformed part 133 (see FIG. 3). The seat part 131 has a rectangular plate-like shape and is located in the battery case 110. The shaft part 132 has a columnar shape protruding from the upper surface 131f of the seat part 131 and is inserted through the through hole 113h of the lid member 113 constituting the battery case 110 (see FIG. 4). The deformed part 133 is a portion continuous with an upper end of the shaft part 132 and is formed by caulking or riveting, that is, deformed to extend in diameter into a circular disk shape, and thus electrically and mechanically joined to the positive external terminal 137 mentioned below. On the other hand, the positive connecting part 134 is shaped to extend from a lower surface 131b of the seat part 131 toward a bottom 110b of the battery case 110 and is welded to the positive electrode sheet 151 (the positive electrode foil 152) of the electrode body 150. The deformed part 133 before formed by caulking has a cylindrical shape (see FIG. 4), which is inserted together with the shaft part 132 into the first insulating member 170, the lid member 113, the second insulating member 180, and the positive external terminal 137 in this order (see FIG. 4) at the time of manufacture of a battery, so that a distal end (a portion which will be the positive deformed part 133) protrudes more than the positive external terminal 137 out of the battery case 110. The deformed part 133 is plastically deformed to be radially widened, thereby fixing the positive external terminal 137 by caulking or riveting to the lid member 113 through the second insulating member 180 (see FIG. 3).

The positive external terminal 137 is formed in a nearly Z shape (a crank-like shape) in side view from a plate made of Al—Mg aluminum alloy (A5052-H38 material) having a plate thickness T1 of 1.5 mm. This positive external terminal 137 includes a fixed part 137f fixed by the deformed part 133, a connection part 137g connected to the positive bolt 139, and a joint part 137h joining the fixed part 137f and the connection part 137g. The connection part 137g is formed with a through hole 137c penetrating therethrough. In this through hole 137c, the shaft part 139c of the aforementioned positive bolt 139 is inserted (see FIG. 3). The fixed part 137f is also formed with a through hole 137b penetrating therethrough. In this through hole 137b, the shaft part 132 of the positive extending member 130 is inserted (see FIG. 3).

On the other hand, the negative extending member 140 made of pure copper (C1100-1/2H material) also includes, as with the positive extending member 130, the seat part 141, a shaft part 142, a negative connection part 144, and a negative deformed part 143 (see FIG. 3). The seat part 141 has a rectangular plate-like shape and is located in the battery case 110. The shaft part 142 has a columnar shape protruding from the upper surface 141f of the seat part 141 and is inserted through the through hole 113k of the lid member 113 (see FIG. 4). The negative deformed part 143 is a portion continuous with an upper end of the shaft part 142 and is formed by caulking or riveting, that is, deformed to extend in diameter into a circular disk shape, and thus electrically and mechanically joined to the negative external terminal 147 mentioned below. On the other hand, the negative connecting part 144 is shaped to extend from a lower surface 141b of the seat part 141 toward the bottom 110b of the battery case 110 and is welded to the negative electrode sheet 156 (the negative electrode foil 157) of the electrode body 150. The deformed part 143 before formed by caulking also has a cylindrical shape (see FIG. 4), as with the positive electrode side, which is inserted together with the shaft part 142 into the first insulating member 170, the lid member 113, the second insulating member 180, and the negative external terminal 147 in this order (see FIG. 4) at the time of manufacture of a battery, so that a distal end (a portion which will be the negative deformed part 143) protrudes more than the negative external terminal 147 out of the battery case 110. The deformed part 143 is plastically deformed to be radially widened, thereby fixing the negative external terminal 147 by caulking or riveting to the lid member 113 through the second insulating member 180 (see FIG. 3).

Further, the negative external terminal 147 is formed in a nearly Z shape (a crank-like shape) in side view from a plate made of pure copper (C1100-1/2H material) which is the same as the aforementioned negative extending member 140, and has a plate thickness T2 of 1.0 mm. However, the plate thickness T2 of the negative external terminal 147 is thinner than the plate thickness T1 of the aforementioned positive external terminal 137 (T2<T1). This negative external terminal 147 includes a fixed part 147f fixed by the negative deformed part 143, a connection part 147g connected to the negative bolt 149, and a joint part 147h joining the fixed part 147f and the connection part 147g. The connection part 147g is formed with a through hole 147c penetrating therethrough. In this through hole 147c, the shaft part 149c of the aforementioned negative bolt 149 is inserted (see FIG. 3). The fixed part 147f is also formed with a through hole 147b penetrating therethrough. In this through hole 147b, the shaft part 142 of the negative extending member 140 is inserted (see FIG. 3).

In each battery 100 in the present embodiment, the deformed part 133 of the positive extending member 130 is made of pure aluminum having tensile strength of 105 N/mm² as mentioned above, the positive external terminal 137 is made of aluminum alloy having tensile strength of 195 N/mm², and the deformed part 143 of the negative extending member 140 and the negative external terminal 147 are made of pure copper having tensile strength of 245 N/mm², respectively. In each battery 100, specifically, the metal forming the deformed part 133 of the positive extending member 130 has the lowest tensile strength among the metals forming the deformed part 133 of the positive extending member 130, the positive external terminal 137, the deformed part 143 of the negative extending member 140, and the negative external terminal 147.

When two or more of the batteries 100 mentioned above are to be connected together to form the battery pack 1, each two of the batteries 100, 100 are connected to each other with one bus bar 2. In the battery pack 1 in the present embodiment, as shown in FIG. 1, the positive external terminal 137 of one of the two batteries 100 is fastened to the bus bar 2, and this bus bar 2 is fastened to the negative external terminal 147 of the other battery 100, so that the plurality of batteries 100, 100 (fifty batteries 100 in the present embodiment) are connected in series.

Meanwhile, there is a case where the position of the positive external terminal 137, the negative external terminal 147, or the bus bar 2 is displaced from an ideal position due to dimensional tolerance or assembling error of the positive external terminal 137, the negative external terminal 147, the bus bar 2, or the battery case 110. In such a case, when one of the two batteries 100 is connected to the other battery 100 by fastening the positive external terminal 137, the negative external terminal 147, and the bus bar 2, the positional displacement causes deformation of the positive external terminal 137, the negative external terminal 147, and the bus bar 2.

Figure 5:
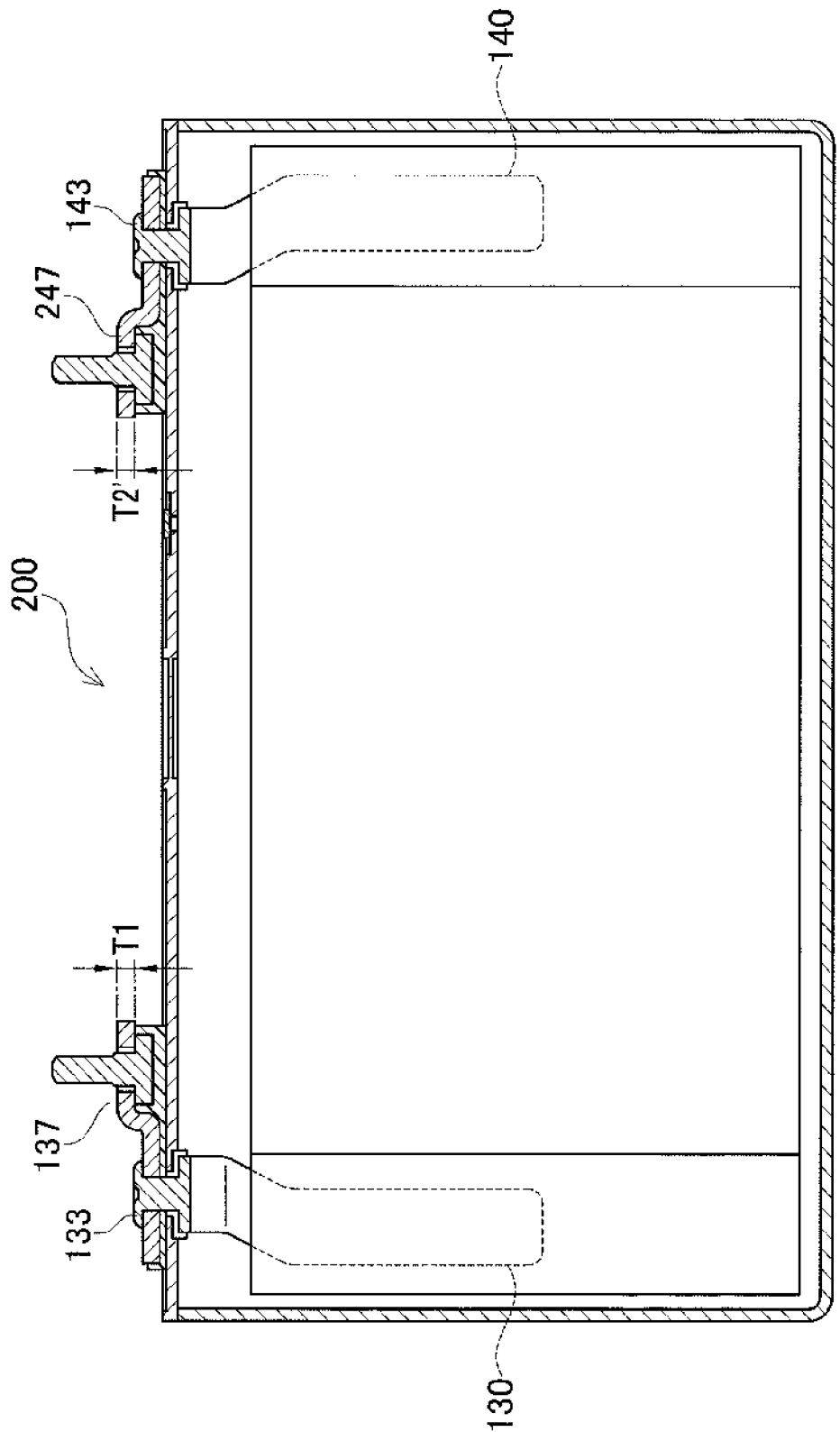
FIG. 5 is a vertical sectional view of a battery in a comparative example.

Herein, as a comparative example of the aforementioned battery 100, there is shown a battery 200 different only in using a negative external terminal 247 having a plate thickness T2' equal to the plate thickness T1 of the positive external terminal 137 (T2'=T1) (see FIG. 5). In this battery 200, the metal materials forming the positive deformed part 133, the positive external terminal 137, the negative deformed part 143, and the negative external terminal 247 are the same as those in the battery 100 in the first embodiment. Accordingly, in this battery 200, as with the battery 100, the tensile strength of the metal forming the positive deformed part 133 is the lowest among the metals forming the positive deformed part 133, the positive external terminal 137, the negative deformed part 143, and the negative external terminal 247.

The following consideration will be given to the case where the positive external terminal 137, the negative external terminal 247, or the bus bar 2 is deformed in association with the aforementioned displacement caused when the batteries 200 are connected to each other in series. In each battery 200, as shown in FIG. 5, the positive external terminal 137 and the negative external terminal 247 have the same shape and the positive deformed part 133 of the positive extending member 130 and the negative deformed part 143 have the same shape. Regarding the tensile strengths of the positive external terminal 137 and the negative external terminal 247, they are relatively high values (290 N/mm$^2$ and 245 N/mm$^2$, respectively). Thus, these positive external terminal 137 and negative external terminal 247 are less likely to be plastically deformed. The stress associated with deformation is thus applied to the positive deformed part 133 through the positive external terminal 137 and to the negative deformed part 143 through the negative external terminal 147. Since the negative deformed part 143 is made of pure copper having high tensile strength, it is less likely to be plastically deformed. On the other hand, since the positive deformed part 133 is made of pure aluminum having low tensile strength, the positive deformed part 133 is relatively liable to be plastically deformed due to stress. Thus, the caulking or fastening state of the positive deformed part 133 may be loosened. When the caulking state comes loose, for example, it may deteriorate the sealing performance of the aforementioned first insulating member 170 placed between the upper surface 131f of the seat part 131 of the positive extending member 130 and the battery case 110 with respect to the through hole 113h of the lid member 113, cause drop-off of the positive external terminal 137, and other defects.

In the battery 100 in the present embodiment, in contrast, the negative external terminal 147 has the plate thickness T2 thinner than the plate thickness T1 of the positive external terminal 137. Thus, the negative external terminal 147 is more easily bent and deformed than that in the battery 200 in which the plate thickness of the negative external terminal 147 is equal to the plate thickness T2' of the positive external terminal 137. Accordingly, even when the position of the positive external terminal 137, negative external terminal 147, or bus bar 2 is displaced from the ideal position when the batteries 100 are connected in series, thereby causing the stress due to the deformation in association with fastening of the positive external terminal 137, negative external terminal 147, and bus bar 2, the negative external terminal 147 can be deformed to absorb part of the stress. By an amount corresponding to the stress absorbed by the negative external terminal 147, the stress to be applied to the positive deformed part 133 can be reduced and hence prevented from becoming plastically deformed. Consequently, the battery pack 1 in the present embodiment is achieved as a battery pack 1 using the batteries 100 configured to suppress loosening of caulking between the positive deformed part 133 of the positive extending member 130 and the positive external terminal 137.

Furthermore, the electric conductivity σ1 of pure copper forming the negative external terminal 147 is σ1=59.0×10$^6$ S/m (20° C.), which is higher than the electric conductivity σ2 (=37.4×10$^6$ S/m (20° C.)) of pure aluminum forming the positive external terminal 137. Accordingly, as compared with the case where the plate thickness T1 of the positive external terminal 137 is thinner, the case where the plate thickness T2 is made thinner than the plate thickness T1 of the positive external terminal 137 can suppress the resistance increase of the negative external terminal 147. Thus, the battery pack 1 can be provided by using the batteries 100 entirely having reduced conduction resistance.

In the battery pack 1 in the present embodiment, the positive deformed part 133 of the positive extending member 130 is made of pure aluminum, the positive external terminal 137 is made of aluminum alloy, and the negative deformed part 143 of the negative extending member 140 and the negative external terminal 147 are each made of pure copper. Accordingly, the members on the positive electrode side (the positive extending member 130 and the positive external terminal 137) and the members on the negative electrode side (the negative extending member 140 and the negative external terminal 147) can provide good electrical conductive performance. Since the metal forming the positive deformed part 133 of the positive extending member 130 is pure aluminum and the metal forming the negative deformed part 143 of the negative extending member 140 is pure copper, the battery can be provided with the positive deformed part 133 and the negative deformed part 143 each appropriately deformed by caulking or riveting. In addition, the positive external terminal 137 is made of aluminum alloy (alloy number A5052H38) and the negative external terminal 147 is made of pure copper, so that the positive external terminal 137 and the negative external terminal 147 can also be appropriately prevented from buckling due to fastening with the bus bar 2.

The present invention is explained above in the embodiment, but is not limited thereto. The invention may be embodied in other specific forms without departing from the essential characteristics thereof. In the above embodiment, for example, the positive external terminal 137 and the negative external terminal 147 are shown in the Z-like shape (the crank-like shape). As an alternative, for instance, a flat plate-shaped terminal or an L-shaped terminal may also be adopted. Further, although the above embodiment shows positive external terminal 137 and the negative external terminal 147 having the same shape excepting their thicknesses, these terminals may also have different shapes from each other.

REFERENCE SIGNS LIST

1 Battery pack
2 Bus bar
9 Nut (Positive fastening member, Negative fastening member)
100 Battery
110 Battery case
130 Positive extending member
133 Positive deformed part (Positive external extending part)
137 Positive external terminal
139 Positive bolt (Positive fastening member)
140 Negative extending member
143 Negative deformed part (Negative extending part)
147 Negative external terminal
149 Negative bolt (Negative fastening member)
150 Electrode body
151 Positive electrode sheet (Positive electrode)
156 Negative electrode sheet (Negative electrode)
T1, T2 Plate Thickness

The invention claimed is:

1. A battery pack comprising a plurality of batteries connected in series, each of the batteries including:
   an electrode body;
   a battery case housing the electrode body;
   a positive extending member made of metal and connected to a positive electrode of the electrode body in the battery case and extended out of the battery case by penetrating through the battery case;
   a positive external terminal made of a metal plate, placed entirely outside the battery case, and mechanically joined to a positive external extending part of the positive extending member, the positive external extending part being located outside the battery case and deformed by caulking to fix the positive external terminal to the battery case, the positive external terminal being electrically connected to the positive external extending part;
   a negative extending member made of metal and connected to a negative electrode of the electrode body in the battery case and extended out of the battery case by penetrating through the battery case; and
   a negative external terminal made of a metal plate, placed entirely outside the battery case, and mechanically joined to a negative external extending part of the negative extending member, the negative external extending part being located outside the battery case and deformed by caulking to fix the negative external terminal to the battery case, the negative external terminal being electrically connected to the negative external extending part,
   among metals forming the positive external extending part of the positive extending member, the positive external terminal, the negative external extending part of the negative extending member, and the negative external terminal, the metal forming the positive external extending part of the positive extending member has lowest tensile strength,
   wherein the battery pack includes:
   bus bars each placed between the positive external terminal of one of the batteries and the negative external terminal of another one of the batteries to connect the positive external terminal and the negative external terminal;
   a positive fastening member fastening the positive external terminal of the one of the batteries to the bus bar; and
   a negative fastening member fastening the negative external terminal of the another one of the batteries to the bus bar,
   each of the batteries is configured such that the negative external terminal connected to the negative extending member by caulking deformation of the negative external extending part has a thinner plate thickness than a plate thickness of the positive external terminal connected to the positive extending member by caulking deformation of the positive external extending parts.

2. The battery pack according to claim 1, wherein the metal forming the negative external terminal is a material having higher electrical conductivity than the metal forming the positive external terminal.

3. The battery pack according to claim 2, wherein
   the metal forming the positive external extending part of the positive extending member is pure aluminum,
   the metal forming the positive external terminal is aluminum alloy, and
   both the metal forming the negative external extending part of the negative extending member and the metal forming the negative external terminal are pure copper.

* * * * *